UNITED STATES PATENT OFFICE.

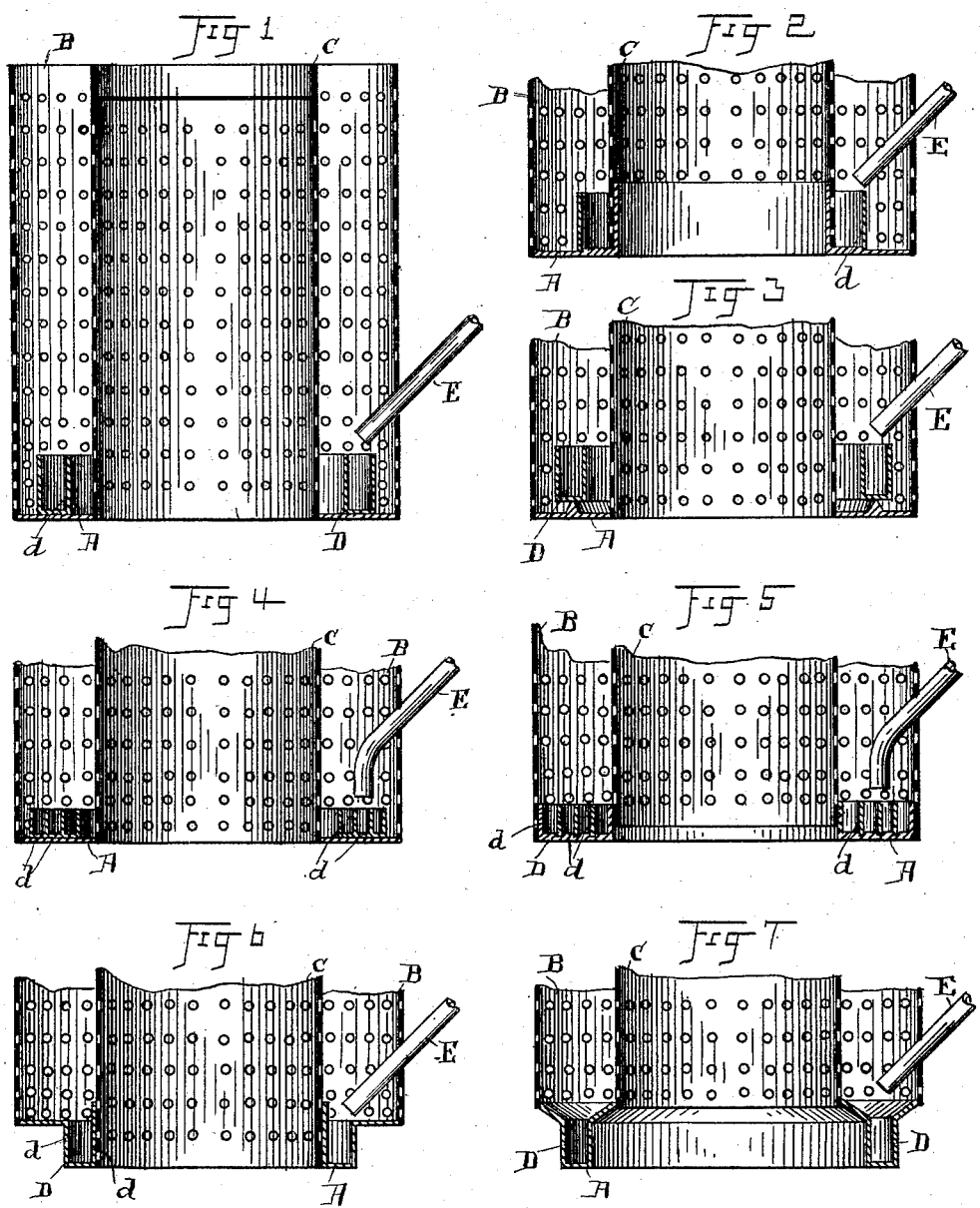

JOHN A. LANNERT AND WILLIAM R. JEAVONS, OF CLEVELAND, OHIO.

VAPOR-BURNER.

SPECIFICATION forming part of Letters Patent No. 474,175, dated May 3, 1892.

Application filed November 9, 1891. Serial No. 411,269. (No model.)

*To all whom it may concern:*

Be it known that we, JOHN A. LANNERT and WILLIAM R. JEAVONS, citizens of the United States, residing at Cleveland, in the county of Cuyahoga and State of Ohio, have invented certain new and useful Improvements in Vapor-Burners; and we do hereby declare that the following is a full, clear, and exact description of the invention, which will enable others skilled in the art to which it appertains to make and use the same.

This invention relates to vapor-burners of the variety having a combustion-chamber formed by perforated walls and a vapor-diffusing channel in the bottom of said chamber.

The object of the invention is to provide a burner in which the vapor is diffused evenly to all parts thereof and the burner is adapted to be brought to a vaporizing condition in the shortest possible time, all substantially as shown and described, and particularly pointed out in the claim.

Figure 1 is a vertical central section of a burner constructed on the principle of this invention and provided in the bottom of the combustion-chamber with a vapor diffusing or distributing channel of greater height than width and entirely separate from the perforated walls. Fig. 2 is a modification of the construction shown in Fig. 1, in which the inner perforated wall forms a continuation of one of the walls of the vapor-diffusing channel. Fig. 3 is a modification in which the construction is substantially similar to that shown in Fig. 1, excepting that the vapor-distributing channel or trough is set a slight distance above the bottom of the combustion-chamber. In Fig. 4 is shown a modification having three concentric vapor-distributing channels on the bottom of the burner and separate or apart from the perforated walls. Fig. 5 is a modication in which there are four concentric vapor distributing or diffusing channels, the two outer channels having walls with which the perforated tubes are directly connected. In this figure and in Fig. 4 the inner bands or rings forming the subdivisions of the channels are preferably made separate. Fig. 6 is a modification showing the bottom of the combustion-chamber with a depression at its inner side, which depression forms a vapor-distributing channel, and in Fig. 7 there is a modification with a central depression in the bottom of the combustion-chamber and partly-inclined walls, with which the perforated tubes are connected.

In all the foregoing views the diffusing channel or channels are of greater depth than width, and also in all these views there are one or more walls of the vapor-diffusing channel which stand inward from one of the perforated walls of the combustion-chamber in vertical plane and in such relation to said plane that there is a space between the vertical planes of the said parts, and the said channels are in all cases open at their top and between the planes of the combustion-walls.

In all the views A represents the bottom of the burner, and B and C are the perforated tubes forming the walls of the combustion-chamber, which is between said walls from bottom to top.

In Fig. 1 the vapor-diffusing channel is formed, preferably, by a separate trough D, having walls $d$, and the said trough is midway between the perforated walls B C. In this construction the said trough and the vapor therein is heated in part by the jets of flame at the base of the burner, which send their heat largely against the walls $d$, and the vapor as it overflows the said channel supplies combustion in the extreme bottom of the burner or what is termed the "bottom of the combustion-chamber."

In Fig. 2 the inner perforated wall C is concentric with the inner wall $d$ of the vapor-channel and extends upward therefrom, the other wall $d$ being apart from perforated wall B.

In Fig. 3 the vapor-channel trough D is raised somewhat above the bottom of the burner and is midway between the two combustion-walls B C.

In Fig. 4 a series of three concentric channels is formed by concentric subdividing rings, bands, or walls $d$, but yet having a space between the outer wall $d$ on each side and the corresponding perforated wall of the combustion-chamber.

In Fig. 5 the trough D has its outer walls concentric with the walls B C, which are connected with said walls $d$, and within the said outer walls $d$ are three inner subdivision-walls $d$, and all said walls together forming four diffusing-channels separated as shown and described.

In Fig. 6 the trough D has a depressed channel formed therein at one side with walls $d\ d$, as in the other constructions, and serving as a vapor-diffusing channel, the same as in the others.

In Fig. 7 the vapor-diffusing channel is central in the trough D, and at its top the sides of the trough extend outward and upward from said channel and have the tubes B C attached thereto.

One or more vapor-channels of greater height than width are thus shown in the several views, and the number of modifications might be extended to further illustrate the invention; but the foregoing are deemed sufficient to show the scope and nature thereof.

It is understood in regard to this art that vapor of oils whenever shielded from air will gravitate or diffuse. Thus the vapor in trough or bowl D gravitates or distributes equally to all parts around the same, and when full it flows over equally all around on one or both sides. The burner being lighted, the flame burning about the tube E and the side of the channel quickly generates enough vapor to fill the channel, and the vapor escaping at all points and burning about the walls of channel quickly heats it to its maximum. When the burner is fully heated, nearly all the vapor is generated in the supply-pipe.

Having thus described the invention, what we claim as new, and desire to secure by Letters Patent, is—

A vapor-burner provided with perforated combustion-walls, and an air-tight bottom between the lower ends of said walls, and an oil and vapor distributing channel having greater depth than width and one or both of its sides out of line with the said perforated walls, said channel open about its top, substantially as described.

Witness our hands to the foregoing specification this 6th day of November, 1891.

JOHN A. LANNERT.
WILLIAM R. JEAVONS.

Witnesses:
H. T. FISHER,
NELLIE L. MCLANE.